United States Patent [19]

Heemels et al.

[11] Patent Number: 5,369,576
[45] Date of Patent: Nov. 29, 1994

[54] METHOD OF INFLECTING WORDS AND A DATA PROCESSING UNIT FOR PERFORMING SUCH METHOD

[75] Inventors: Robertus P. E. H. Heemels, Roermond; Eduardus J. W. van Vliembergen; Louis M. G. Cremers, both of Venlo, all of Netherlands

[73] Assignee: Oce-Nederland, B.V., Venlo, Netherlands

[21] Appl. No.: 915,676

[22] Filed: Jul. 21, 1992

[30] Foreign Application Priority Data

Jul. 23, 1991 [NL] Netherlands .................. 9101286

[51] Int. Cl.$^5$ ............................................ G06F 15/38
[52] U.S. Cl. ........................... 364/419.08; 364/419.07
[58] Field of Search ............... 364/419, 419.07, 419.08

[56] References Cited

U.S. PATENT DOCUMENTS

| | | | |
|---|---|---|---|
| 4,724,523 | 2/1988 | Kucera | 364/419 |
| 4,862,408 | 8/1989 | Zamora | 364/900 |
| 4,864,501 | 9/1989 | Kucera et al. | 364/419 |

FOREIGN PATENT DOCUMENTS

| | | | |
|---|---|---|---|
| 0168814 | 1/1986 | European Pat. Off. | G06F 15/38 |
| 0241717 | 10/1987 | European Pat. Off. | G06F 15/20 |
| 0434586 | 6/1991 | European Pat. Off. | G06F 15/40 |
| 2575309 | 12/1985 | France | G06F 15/38 |

OTHER PUBLICATIONS

European Search Report.

*Primary Examiner*—Roy N. Envall, Jr.
*Assistant Examiner*—Ari M. Bai
*Attorney, Agent, or Firm*—Birch, Stewart, Kolasch & Birch

[57] ABSTRACT

To enable inflected word forms to be derived, a method and a data processing unit are provided for inflecting a given word and for adapting the lexical data of the word correspondingly by reference to a classification scheme containing inflection rules for a given natural language. The effect achieved is that inflected word forms do not have to be contained in an electronic word register, and this results in a considerable reduction in memory space occupied by the word register.

8 Claims, 4 Drawing Sheets

METHOD OF INFLECTING WORDS AND A DATA PROCESSING UNIT FOR PERFORMING SUCH METHOD

BACKGROUND OF THE INVENTION

1. Field of the Invention

The instant invention relates to a method of inflecting words, and more specifically to a word inflection method and to a data processing unit suitable for performing such a method.

2. Discussion of the Related Art

A method and data processing unit for word inflection are known from U.S. Pat. No. 4,724,523. The method described therein has the object, inter alia, of providing efficient storage of digital signals representing linguistic data by the use of inflection routines. As a result, it is no longer necessary to store all the inflected words in a memory, and the technical effect of this is that there is a considerable savings in memory space. However, such a system is not without its disadvantages. A first disadvantage of the inflection routines described is that these routines require frequent access to a mass storage system, and this results in a considerable decline in performance. A second disadvantage is that the linguistic data relating to inflection categories is spread over various memory segments, with the result that it is a difficult process to make inflection routines suitable for a different language.

SUMMARY OF THE INVENTION

Therefore, it is an object of the present invention to provide a method and apparatus for inflecting words which will overcome the above-noted disadvantages.

One preferred embodiment of the method of the present invention is characterized by selecting, in the list of a first type, the first element occurring which has a grammatical category which corresponds to the grammatical category contained by the input data; selecting, in the list of a second type associated with the selected element from the list of the first type, the first element occurring which has a required inflection category which corresponds to the required inflection category from the input data; selecting, in the list of a third type associated with the selected element from the list of the second type, the first element occurring in which all the grammatical features from a first group are contained by the grammatical features from the input data; selecting, in the list of a fourth type associated with the selected element from the list of the third type, the first element occurring which corresponds, as regards the inflection code, to an inflection code of the input data; performing on the input word the string operations contained by the element selected from the list of the fourth type; and adapting features by replacing the features from the first group by the features from a second group if the string operations mentioned in the previous step are successful. This allows for adaptation of the lexical data as a result of the changed inflection of the word.

It is a further object of the invention to provide a word inflection system comprising an inflection step in which an input word is inflected by reference to linguistic data stored in a memory and on the basis of input data.

Still, a further object of the present invention is based on accommodating in a memory segment some of the information required for inflecting words, in a manner particularly suitable for processing.

The foregoing objects and others are accomplished in accordance with the present invention, generally speaking, by providing a method of inflecting words comprising an inflection step in which the input word is inflected by reference to linguistic data stored in a memory, and on the basis of input data comprising an input word to be inflected, a grammatical category associated with the input word, grammatical features associated with the input word, and a required inflection category. The invention also relates to a data processing unit suitable for performing such a method, characterized in that the linguistic data is stored in the form of a classification scheme in a random access portion of the memory, the classification scheme comprising a number of nested lists each comprising elements relating to grammatical properties, and in that the inflection step comprises selecting inter-nested lists on the basis of the input data, followed by selection of an element from the last selected list on the basis of the input data, which element comprises string operations, and performing the string operations for inflecting the input word. This provides a compact and efficient storage structure of linguistic data required in the inflection of words readily exchangeable, so that the method can readily be made suitable for a different language by using a classification scheme applicable to that language In a following alternate embodiment, the method of the present invention is characterized by changing the required inflection category to a predetermined inflection category if, on the basis of the input data, it is not possible to select an element in one of the lists because there is no agreement between the input data and the elements, followed by performance of the inflection step on the changed input data and, on the basis of the originally required inflection category, re-performing the inflection step on the result thus obtained. As a result, not all the changes from one inflection category to the other inflection category have to be included in the classification scheme. If the required change is not included, the input word is first inflected to a predetermined inflection category (e.g. first person singular) using the method according to the invention. The input word inflected in this way is then inflected again, but now to the originally required inflection category. The change from the current inflection to the required inflection is now split into a change from the current inflection to, e.g. singular 1 and a change from singular 1 to the originally required inflection.

Another further embodiment of the method of the present invention is characterized in that the input data contains irregular inflections of the input word from which an inflection is selected on the basis of the required inflection category. The effect of this is that there is no need to consult a lexical vocabulary stored in a mass memory, even for irregular inflection categories.

The data processing unit according to the instant invention is characterized in that the linguistic data is stored in the form of a classification scheme in a memory segment, the classification scheme comprising a number of nested lists each comprising elements relating to grammatical properties and in that the means are adapted to co-operate with the memory segment in which the classification scheme is stored.

BRIEF DESCRIPTION OF THE INVENTION

Other features and advantages of the invention will be apparent from the following description and by reference to the drawings wherein.

DETAILED DISCUSSION

Before discussing the method according to the invention, the configuration of the classification scheme to be used in the method will first be explained. Table 1 is an embodiment of the classification scheme suitable for inflecting a number of Dutch words in conjunction with the method herein described. It is a simple matter to expand the classification scheme for other linguistic rules, but the classification scheme shown here is sufficient to enable the invention to be completely and clearly explained.

| Classification Scheme |
|---|
| ((NOUN |
|   (PLU3 |
|     ((SING3 DIMINUTIVE) (PLU3 DIMINUTIVE) |
|      (12 8 # +s)) |
|     ((SING3) (PLU3) |
|      (12 8 # +en))) |
|   (SING3 |
|     ((PLU3 DIMINUTIVE) (SING3 DIMINUTIVE) |
|      (12 8 # −s)) |
|     ((PLU3) (SING3) |
|      (12 8 # −en))) |
|   (DIMINUTIVE |
|     ((SING3) (SING3 DIMINUTIVE) |
|      (12 # −g +kje) |
|      (8 # +tje)) |
|     ((PLU3) (PLU3 DIMINUTIVE) |
|      (12 # −gen +kjes) |
|      (8 # −en +tjes))) |
|   (UNDIMINUTIVE |
|     ((PLU3 DIMINUTIVE) (SING3) |
|      (12 # −kjes +g) |
|      (8 # −tjes)))) |
| (VERB |
|   (SING1 |
|     ((PLU1 PLU2 PLU3 PRESENT) (PRESENT SING1) |
|      5 # −en) |
|      (18 # −zijn +ben)) |
|     ((SING2 SING3 PRESENT) (SING1 PRESENT) |
|      (−2 # x1) |
|      (5 # −t)) |
|     ((SING3 SING2 PRESENT) (SING1 PRESENT) |
|      (−2 # x1) |
|      (5 # −t)) |
|     ((PASTPART) (SING1 PRESENT) |
|      (−2 # x1) |
|      (5 # B −t)) |
|     ((PLU1 PLU2 PLU3 PAST) (PAST SING1 SING2 SING3) |
|      (−2 # x1)) |
|     ((SING2 PRESENT) (SING1 PRESENT) |
|      (−2 # x1) |
|      (18 # −t))) |
|   (SING2 |
|     ((SING1 PRESENT) (SING2 SING3 PRESENT) |
|      (−2 # x1) |
|      (5 # &t)) |
|     (PRESENT SING3) (PRESENT SING2) |
|      (−2 # x1) |
|      (5 # 0)) |
|     ((PLU1 PLU2 PLU3 PRESENT) (PRESENT SING2 SING3) |
|      (−2 # x!) |
|      (5 # −en &t)) |
|     ((PLU1 PLU2 PLU3 PAST) (PAST SING1 SING2 SING3) |
|      (−2 # x1) |
|      (5 # −n)) |
|     ((SING1 PRESENT) (SING2 PRESENT) |
|      (18 # +t)) |
|     ((SING3 PRESENT) (SING2 PRESENT) |
|      (18 # −is +bent)) |
|     ((PLU1 PLU2 PLU3 PRESENT) (SING2 PRESENT) |
|      (18 # −zijn +bent))) |
|   (PLU1 |
|     ((PAST SING1 SING2 SING3) (PAST PLU1 PLU2 PLU3) |
|      (−2 # x5))) |
|   (PASTPART |
|     ((SING1 SING2 SING3 PAST) (PASTPART) |

-continued

| Classification Scheme |
|---|
| (−2 # x7) |
| (5 # P K) |
| (17 # S A F)) |
| ((SING1 PRESENT) (PASTPART) |
| (5 # P K) |
| (17 # S A F))) |
| (ARTICLE |
| (INNEUTER |
| ((NEUTER) (INNEUTER PLU3) |
| (16 # −het +de))) |
| (NEUTER |
| ((INNEUTER PLU3) (NEUTER) |
| (16 # −de +het))) |
| (PLU3 |
| ((NEUTER) (INNEUTER PLU3) |
| (16 # −het +de))))) |

The classification scheme of Table 1 has a nested list structure which will be explained with reference to FIG. 1. Although not completely, FIG. 1 graphically reproduces the classification scheme of Table 1. Like parts are indicated by like references.

Figure 1:
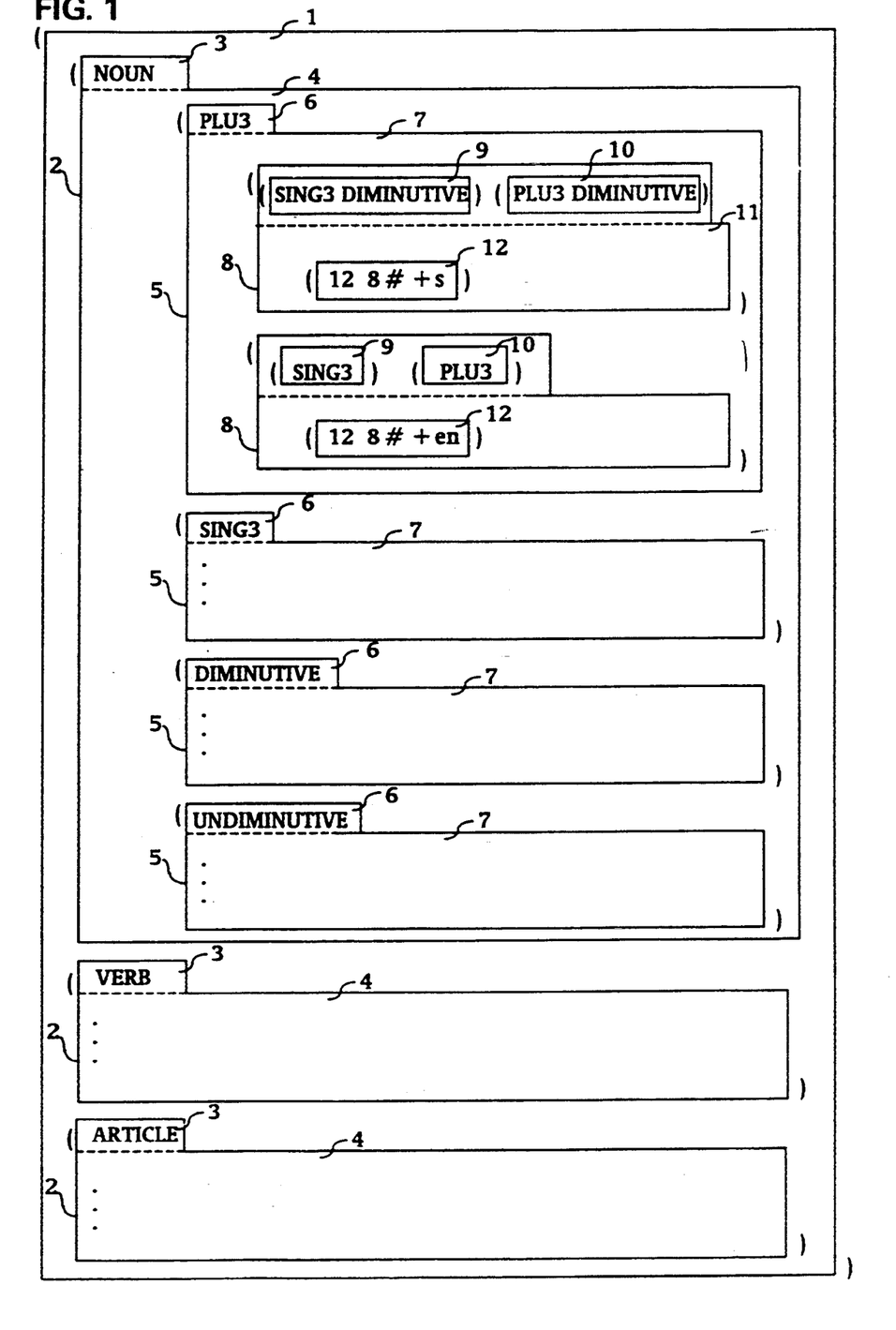
FIG. 1 is a graphic representation of a classification scheme.

The classification scheme of FIG. 1 is formed by a list of the first type 1, of which the elements 2 each have a grammatical category 3 and a list of the second type 4. The grammatical categories 3 given in the Figure are: 'NOUN', 'VERB' and 'ARTICLE'. The grammatical category 3 is associated with a list of the second type 4, the elements 5 of which in each case contain information as to a required inflection category 6, and a list of the third type 7. The required inflection categories 6 given in the Figure are consecutively: 'PLU3', 'SING3', 'DIMINUTIVE' and 'UNDIMINUTIVE'. On this basis, the present classification scheme, in principle, provides the possibility of inflecting a noun in accordance with the following required inflection forms: plural form ('plu3'), singular form ('sing3'), diminutive form ('diminutive') and non-diminutive form ('undiminutive'). The list of the third type 7 comprises elements 8 which are, in turn, constructed from a first group of current grammatical features 9, a second group of required grammatical features 10 and a list of the fourth type 11. The first group 9 is the determining factor in the selection of one of the elements 8 from list 7. After an element 8 has been selected, the features of the second group 10 are required to enable the feature list of the word to be adapted to the new inflection form of the word. The list of the third type 11 comprises one or more elements 12 which, in turn, consist of one or more inflection codes, whereafter one or more string operations follow preceded by the character '#'. Inflection codes and string operations will be explained later with reference to Table 2 and Table 3, respectively. If at least one of the inflection codes contained in an element 12 satisfies an inflection code associated with the input word, then the specified string operations are performed on the input word to give the required inflection of the input word.

It should be noted that the invention is not restricted to the embodiment of the classification scheme shown in Table 1. An obvious variant is one in which the nesting of the lists is different, for example, by including the required inflection categories as a list of the first type and the grammatical categories as a list of the second type. This does not affect the essence of the invention. Moreover it is also possible to code the list structure in other ways, this being dependent, inter alia, on the data processing unit on which the method is performed. The coding used in the Table has the advantage that the scheme continues to be readable by the operator and accordingly can easily be changed by data processing means.

The method will now be explained with reference to the flow diagram in FIG. 2. The start situation is shown at 20. The input data is read in at step 21. The input data comprises an input word to be inflected, lexical data of the input word to be inflected and a required inflection category. Inter alia, the lexical data comprises the grammatical category associated with the input word. After the read-in operation, the first element corresponding to that grammatical category is selected from the list of the first type in step 22. If no corresponding element is found (N), end condition 23 is reached. If an element is selected (Y), then the program passes to step 24. As stated previously, the list of the second type consists of elements each comprising a required inflection category and a list of the third type. In step 24, there is selected from the list of the second type associated with the element selected in step 22 the first element corresponding to the required inflection category. If no such element is found (N), the program passes to step 25. This also happens if one of the steps 31 and 32, still to be discussed, is unsuccessful. Step 25 checks whether a first flag F1 has been set. If not (N), the required inflection is converted in step 26 to 'singl', the original input data is stored and flag F1 is set. The program then returns to step 24. The effect of these steps is that if the running through of the nested list structures is unsuccessful, because no corresponding element is found at a particular timer an attempt is started to reach the required result via an intermediate step to the first person singular form. When the method is performed the first time the input word is inflected to 'sing1' whereafter, when the method is performed a second time, the input word inflected to 'sing1' is inflected to the originally required inflection category. This is advantageous because as a result it is not necessary to include in the classification scheme all of the combinations of the current inflection category and the required inflection category, at least insofar as all of the inflections to and all of the inflections from 'sing1' are included. If, in step 25, it is found that flag F1 has been set (Y), this means that there has already been an attempt to convert the required inflection to 'sing1' and that this attempt failed. Step 27 then checks whether a second flag F2 has been set. If this is not the case (N), then in step 29 the original input data, which has been stored, is retrieved. Step 30 is then carried out, in which the value '17' is assigned to the required inflection code and flag F2 is set. Step 24 is then performed again. As a result of these steps, strong regular verbs following a specific sound-change pattern are treated separately, and this gives a simpler classification scheme. If step 27 shows that flag F2 has been set (Y), it means that the attempt to inflect the word by way of the inflection code '17' has failed. End condition 28 is then reached.

As stated previously, in step 24 there is selected from the list of the second type the first element that corresponds to the required inflection category. If an element with a corresponding inflection category is found (Y), the program passes to step 31 in which there is selected from the list of the third type the first element occurring whose grammatical features from the first group are contained by a feature list contained in the lexical data of the input word. If no such element is found (N), the program passes to step 25 already discussed. If such an element is found (Y), step 32 is performed. In step 32 there is selected from the list of the fourth type associated with the element from the list of the third type as selected in step 31, the first element occurring of which one of the inflection codes contained therein corresponds to an inflection code associated with the input word.

Table 2 below gives a number of inflection codes. The first column contains a code for a given inflection group, the second column gives the definition for that group. Inflection codes of this kind can be generated in a simple manner by assigning the same code to stems having the same inflections. The inflection codes are then expanded for special cases by including a separate code. Table 3 gives a list of string operations. The code of the string operation is shown in the first column. The second column gives the definition of the string operation and the third column indicates the conditions under which the string operation must be regarded as successful.

TABLE 2

| Code | Inflection Codes Description |
|---|---|
| 2 | strong verb having +en, +end as inflection |
| 5 | weak verb having +en as inflection |
| 8 | noun having +en, +tje, +tjes as inflection |
| 12 | noun having +en, −g+kje, −g+kjes as inflection |
| 16 | articles |
| 17 | regular strong (sound-changing) verb |
| 18 | verb "zijn" |
| 19 | irregular strong verb |
| −1 | sound-change code: regular strong verb with |

TABLE 2-continued

| Code | Inflection Codes Description |
|---|---|
| −2 | sound change from "ij" to "e" sound-change code: irregular strong verb, irregular forms included in X#-field in the lexical data |

TABLE 3

| Code | String Operations Description | Success condition |
|---|---|---|
| +"x" | add string "x" to end of work, "x" denoting an arbitrary string | none (always successful) |
| &"x" | add string "x" to end of work if "x" is not there | none (always successful) |
| −"x" | remove string "x" from end of word | if "x" occurs at end of word |
| A | place "ge" in front of word or after word prefix | none (always successful) |
| B | remove prefix "ge" from word | none (always successful) |
| F | replace the v (or z) at the end by f (or s) | none (always successful) |
| K | check whether penultimate letter is one of the letters k, f, s, p, t, x, or if the last letters are "ch" | if one of the required conditions is satisfied |
| P | place "ge" in front of word | none (always successful) |
| S | carry out specified sound change and add string "en" | if a sound change is specified |
| xN | take the N-th inflected form from the list of inflected forms contained in the lexical data | if there is an N-th form |

If, in step 32, no element is found. (N) having an inflection code corresponding to the input data, then the method is continued with step 25. I f such an element is found (Y), then step 33 is carried out. In step 33 the string operations included in the element selected in step 32 are carried out on the input word. If one of the string operations to be carried out in step 33 is unsuccessful (N), step 32 is again performed, in which a search is made for a following element, one of the inflection codes of which corresponds to the inflection code of the input word. If all of the string operations to be performed in step 33 are successful (Y), the program passes to step 34 in which the feature list of the input word is brought into agreement with the new situation. For this purpose, the grammatical features in the feature list which occur in the first group of the selected element of the list of the third type are replaced by the grammatical features from the second group. The feature list obtained in this way is suitable for the inflected input word. Step 35 then checks whether the first flag F1 is set. If so (Y), this means that the inflection to 'sing1' carried out as an intermediate step has been successful, so that now the inflection from 'sing1' to the originally required inflection can be performed. For this purpose, the originally required inflection category previously stored in step 26 is again retrieved in step 36 and starting at step 24 the inflection process is performed a second time. If in step 35 it is found that the first flag F1 is not set (N), the input word obtained according to the method and inflected in accordance with the required inflection category is written out in step 37 together with the associated lexical data, so that final condition 38 is reached.

PREFERRED EMBODIMENTS OF THE INVENTION

The above-described method will now be explained in detail with reference to the following examples using the classification scheme of Table 1 and the inflection codes and string operations shown in Table 2 and Table 3, respectively. These examples are intended to illustrate and not limit the subject matter of the present invention.

EXAMPLE 1

The first example will take as the input word 'deur' (the Dutch word for door). The input data is follows:

(deur(noun(rued 8 inneuter male female sing3))) required inflection category: PLU3.

The first line relates to the input word with its lexical data, for example substantially as supplied by a lexicalization module described in patent application NL-A-9101284 combined with an invention described in patent application NL-A-9101285 for processing compound words. The lexical data as indicated above comprises, from left to right:

- the input word: deur
- the grammatical category: noun
- the inverted stem form: rued
- inflection code: 8
- feature list: inneuter male female sing3

Figure 2:
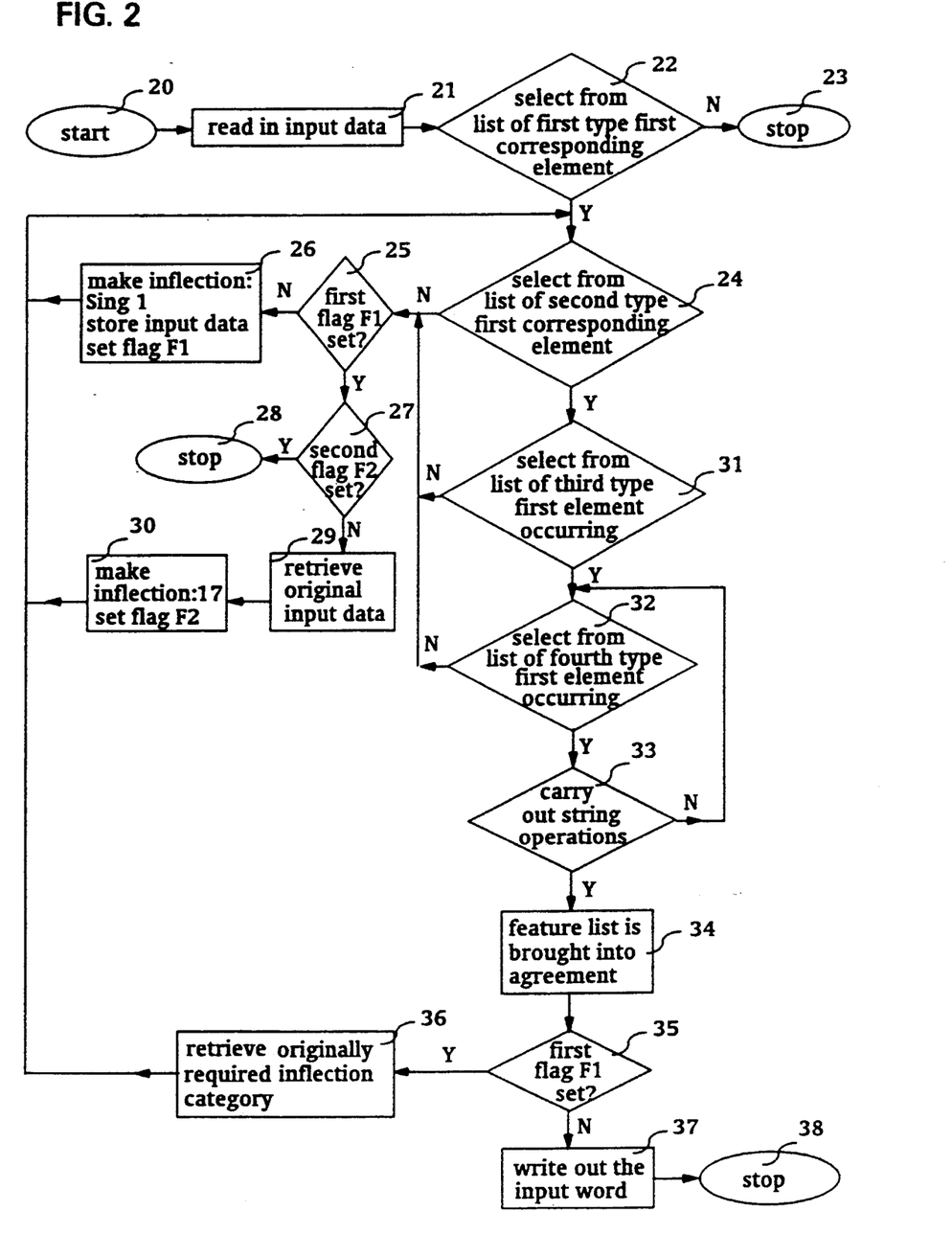
FIG. 2 is a flow diagram of the method according to the invention.

Starting from the starting situation 20 (FIG. 2 the input data is read in at step 21. Then in step 22 there is selected from the list of the first type a first element which corresponds to the grammatical category of the input word. The input word has 'noun' as the grammatical category so that in step 22 that element (See Table 1) is selected (Y). In step 24 there is then selected that element from the list of the second type (See FIG. 1, reference 4) associated with the element 'noun' selected in the previous step, which corresponds to the required inflection category. According to Table 1 this yields element 'PLU3' so that step 24 is successful (Y). The element, all of whose features from the first group are present in the feature list of the input data, is then selected in step 31. According to Table 1, this applies to the element 'SING3' so that step 31 is successful (Y). This selected element comprises a list of the fourth type (FIG. 1, reference 8), from which there is selected in step 32 an element, one of the inflection codes of which corresponds to the inflection code from the input data. The element '(12 8# +en)' given in Table 1 satisfies this since it contains inflection code '8' so that step 32 is successful (Y). The specified string operations are then performed in step 33 and the success thereof is checked. The selected element specifies as the only action, '+en'. The application of this to the input word 'deur' in accordance with the definition specified in Table 3 yields the word 'deuren' inflected in accordance with the required inflection category. The string operation is successful (Y), so that the program passes to step 34, where the feature list is adapted. This is done by replacing the features of the feature list contained in the firs group of the element 'SING3' selected in step 31 by the second group of features of that element, in this case 'PLU3'. A check is then run in step 35 whether the first flag F1 has been set. This is not the case (N) so that in step 37 the inflected word and the adapted lexical data are written out, and this yields:

(deuren (noun (rued 8 plu3 inneuter male female)))

End condition 38 is then reached and the object of the method, i.e. to inflect an input word in accordance with a required inflection category, is achieved.

EXAMPLE 2

A second example below will explain how irregular strong verbs are dealt with. The input data is as follows:

(liep(verb(peil—2 19 p.p.—zijn p.p.—hebben sing3 sing2 sing1 past main transitive
X#(loop,loopt,loopt,lopen,liep,liepen,gelopen,-loop))))

Required inflection category: pastpart

The lexical data from left to right is explained in detail below.

The lexical data from left to right are explained in detail below:

- input word: liep
- grammatical category: verb
- inverted stem: peil
- inflection code: −2(sound-change code)
- inflection code: 19
- feature list: p.p.—zijn p.p.—hebben sing3 sing2 sing 1 past main intransitive X#(loop,loopt,lopen,liep,-liepen,gelopen,loop)

The X# field contained in the feature list contains the irregular forms of the verb.

Starting from the starting position 20, the input data is read in at step 21. Step 22 then selects from the list of the first type that element which contains the grammatical category 'verb'. An element of this kind is present according to Table 1, so that step 22 is successful (Y) and the method continues with step 24. In step 24 there is selected from the list of the second type associated with the grammatical category 'verb' that element which corresponds to the required inflection category 'pastpart'. This element is present (Y), whereupon step 31 is carried out. In step 31 there is selected from the list of the third type associated with the element 'PASTPART', selected in the previous step, the first element occurring, all of whose grammatical features of the first group are contained in the feature list of the input data. The first element satisfies this (Y). The method is continued with step 32, in which a first element corresponding to one of the inflection codes contained in the input data is selected. The element '(−2 #x7)' is satisfactory. String operation x7 means that the seventh word from the X#-field has to be taken. This yields the word 'gelopen' inflected in accordance with the required inflection category. The feature list is then adapted in step 34. This is done by replacing the features from the feature list contained in the first group of the element selected from the list of the second type, in this case 'SING1 SING2 SING3 PAST' by the features given in the associated second group, in this case 'PASTPART'. Step 35 then checks whether the first flag F1 has been set. This is not the case (N), whereupon the data obtained is written out in step 37 to give:

(gelopen(verb(peil−219 pastpart p.p.—zijnp.
p.p.—hebben main intransitive
X#(loop,loopt,loopt,lopen,liep,liepen,gelopen,-loop))))

End situation 38 is then reached.

EXAMPLE 3

In the following third example an illustration will be given of how the method deals with a strong verb, no X#-field being included in the lexical data. The input data is:

(kijk(verb(kijk—12 intransitive main transitive sing 1 present p.p.—hebben p.p—zijn)

required inflection category: pastpart

Starting from the starting position 20, the input data is read in at step 21. The element 'VERB' is then selected in step 22 (Y). The required inflection category 'PAST-PART' is then selected in step 24 (Y). In step 31 the element 'SING1 PRESENT' is then selected (Y), whereupon step 32 searches for an element containing the inflection code '−1' or '2'. There is no such element, so that step 32 is unsuccessful (N), whereupon the program proceeds to step 25, which checks whether the first flag F1 has been set. This is not the case (N), so that the program goes to step 26 in which the required inflection category is converted to 'sing1' the original input data is stored in the memory and flag F1 is set. In step 24 the element 'SING1' is then selected and this is successful (Y). Step 31 then searches for an element having the features 'sing1 present'. There is no such element so that step 31 is unsuccessful (N). This results in step 25 again being performed, which checks whether the flag F1 has been set. This is the case (Y), so that step 27 is performed. This step checks whether the second flag F2 has been set. This is not the case (N), so that the original input data is retrieved again in step 29. Step 30 is then performed in which the value '17' is assigned to the inflection code. The element 'PAST-PART' is then selected in step 24 and is successful (Y). In step 31 the element 'SING1 PRESENT' is then selected (Y) whereupon the program proceeds to step 32, which searches for an element having the inflection code '17'. This is successful (Y) and yields the element '(17 # S A F)'. The program proceeds to step 33, where the string operations S, A and F are performed on the input word. String operation S effects a sound change by replacing 'ij' by 'e' and adds 'en' to the word. The sound change to 'e' is specified by the inflection code '−1' contained in the input data. This yields the word 'keken'. The string operation A puts the prefix 'ge' in front of the word, resulting in the word 'gekeken'. Finally, string operation F is not applicable here and must be regarded as successful, since no further conditions are posed according to Table 3. Since all of the string operations which are to be performed are successful, this means that step 33 is successful (Y) and step 34 must then be carried out. In this step the feature list is adapted, in this case replacement of 'sing1 present' from the feature list by 'pastpart'. Step 35 then checks whether the first flag F1 is set. This is not the case (N), whereupon the data obtained is written out in step 37 giving:

(gekeken (verb (kijk−1 63 pastpart intransitive main transitive p.p.—hebben p.p.—zijn)))

End condition 38 is then reached.

It will be apparent from the previous examples that the method in connection with the classification scheme has a high degree of flexibility with regard to the processing of irregular inflections. In illustration of this, the classification scheme shown in Table 1 also includes a number of inflections of the verb 'zijn' and inflections of the articles. This latter feature, for example, allows a given definite article to be inflected to the indefinite form.

To the skilled artisan it will be apparent that a classification scheme of this kind can also be prepared for other languages. A classification scheme for the English language will be much simpler than that for the Dutch language since English is less inflected than Dutch.

TABLE 4

Classification Scheme

```
((NOUN
  (PLU3
    ((SING3) (PLU3)
      (1 #  +s)
      (2 # -y +ies)))
  (SING3
    ((PLU3) (SING3)
      (1 # -s)
      (2 # -ies +y))))
 (PRONOUN
  (NOMINATIVE
    ((ACCUSATIVE SING3) (NOMINATIVE SING3)
      (20 # -him +he)))))
 (VERB
  (SING1
    ((SING3 PRESENT) (SING1 SING2 PLU1 PLU2 PLU3 PRESENT)
      (3 # -s)
      (4 # -ies +y)))
  (SING3
    ((SING1 SING2 PLU1 PLU2 PLU3 PRESENT) (SING3 PRESENT)
      (3 # +s)
      (4 # -y +ies)))
  (PAST
    ((SING1 PRESENT) (SING1 PAST)
      (3 # +ed)
      (4 # +ied))))
 (ADJECTIVE
  (COMPARITIVE
    ((NORMAL) (COMPARITIVE)
      (10 # +r)
      (11 # +er)
      (12 # −y +ier)))
  (SUPERLATIVE
    ((NORMAL) (SUPERLATIVE)
      (10 # +st)
      (11 # +est)
      (12 # −y +iest)))))
```

An embodiment of a classification scheme for deriving some inflections of a number of English words in conjunction with the method of the present invention is given in Table 4 above. Inflection codes used therein are not the same as those defined in Table 2, which are specific for the Dutch language. As an example for the English language suppose that the verb 'flies' has to be inflected to sing 1.
Input data is:
(flies (verb (4 sing3 main present transitive intransitive)))
required inflection category: sing1
The lexical data as indicated above, comprises from left to right:
the input word: flies
the grammatical category: verb
inflection code: 4
feature list: sing3 main present transitive intransitive
At first there is selected from the list of the first type a first element which corresponds to the grammatical category of the input word. The input word has 'verb' as the grammatical category so that that element of the list of the first type is selected. With this element is a list of the second type associated. From this list of the second type the element with the required inflection category 'sing1' is selected. With this element is a list of the third type associated. From this list of the third type the element comprising the inflection code '4' is selected. This is the element '(4 #—ies +y)'. In compliance with Table 3 the string operations '—ies +y' have the effect that the input word is changed successfully from 'flies' to 'fly'. To obtain the correct lexical data, the feature list is adapted by exchanging 'sing3 present' with 'sing1 sing2 plu1 plu2 plu3 present'. This yields as end result the output data:
(fly (verb (4 sing1 sing2 plu1 plu2 plu3 present transitive intransitive)))

Figure 3:
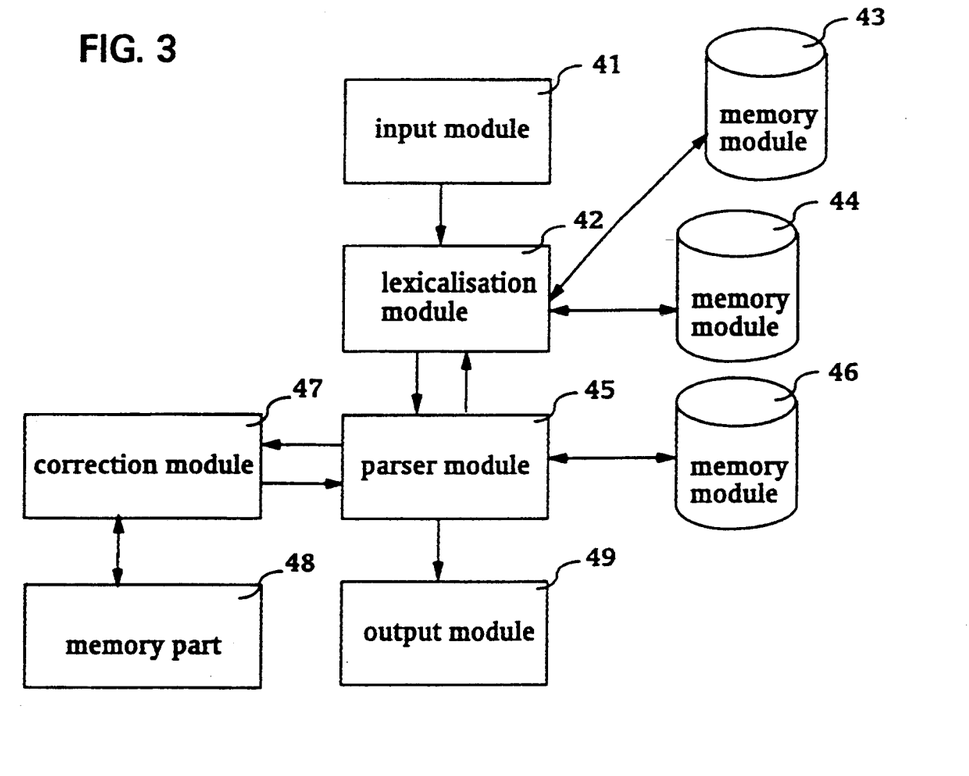
FIG. 3 is a block schematic of a system to be used for inflection correction.

The invention is advantageously to be used in conjunction with a lexicalization module and a parser as an inflection corrector. This is explained in detail with reference to FIG. 3, which is a block schematic of such an inflection corrector. Textual information is fed to the input module 41. This ensures that sentences and words in the sentences are distinguished. The words are fed to a lexicalization module 42, which is connected to a string operation scheme stored in a memory module 43 and to an electronic word register consisting of a list of basic forms which may or may not be expanded by an additional word register and stored in a memory module 44. The lexicalization module defines the lexical data required for grammatical analysis of each input word, such analysis being performed by a parser module 45. On the basis of grammar stored in a memory module 46 and using the lexical data the parser module analyses the sentence. If the lexicalization module indicates that for a word only a pseudo-basic form is found which does not satisfy all the requirements, the parser module can determine which inflection of that basic form is correct on the basis of the grammatical position of the word concerned in the sentence. A correction module 47 operative according to the invention ensures that the word is given the correct inflection in conjunction with a classification scheme stored in a random access memory part 48. The sentence having the correctly inflected word is then output by the output module 49. If a plurality of pseudo-basic forms are found, they are all offered to the user inflected in the correct way and he can then select one. The above-described configuration forms the subject matter of applicant's patent application NL-A-9100849.

Figure 4:
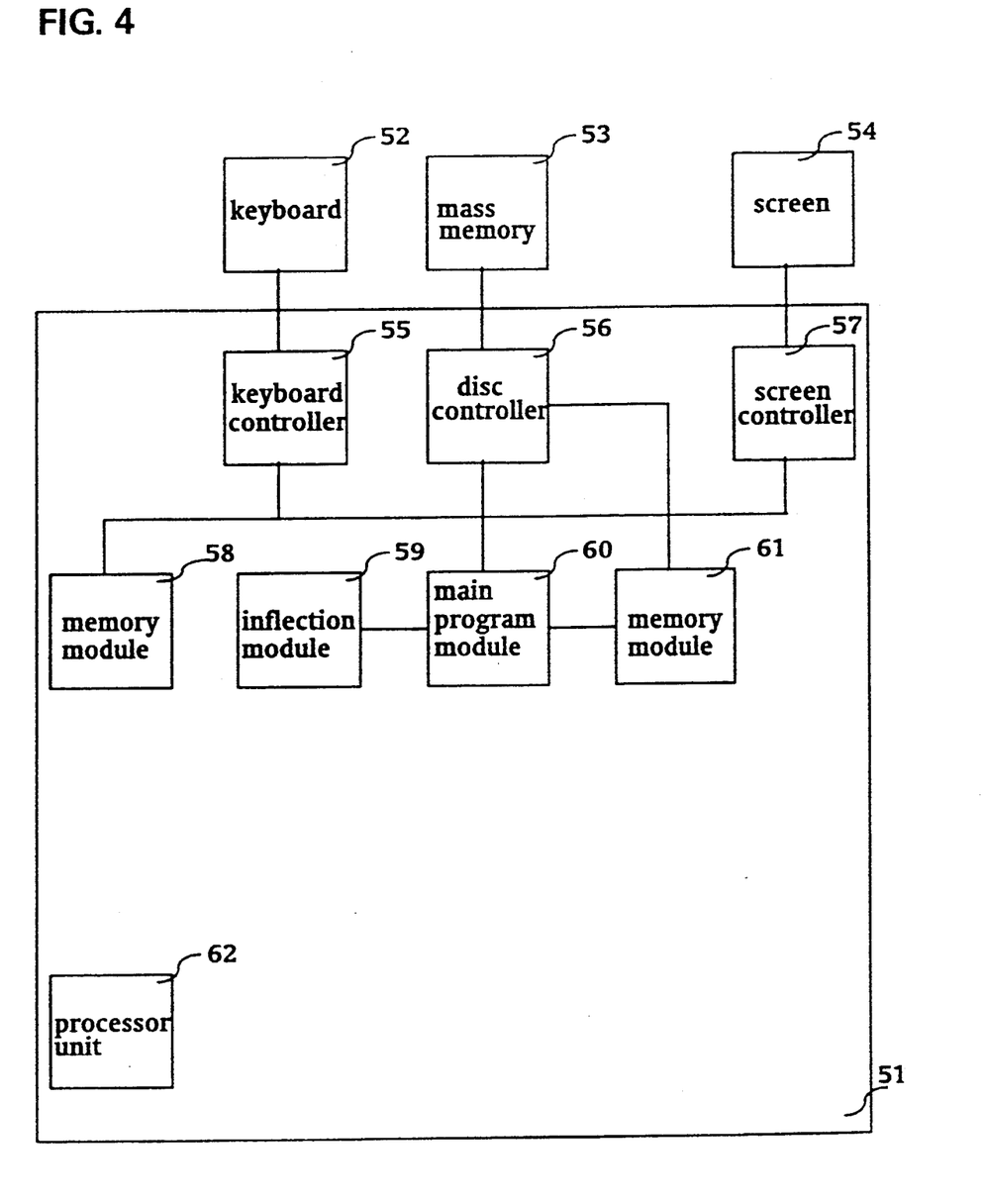
FIG. 4 shows a possible embodiment of a data processing unit according to the invention.

FIG. 4 shows a possible embodiment of a data processing unit according to the present invention data processing unit comprises a main unit 51 and is also provided with a keyboard 52, a mass memory 53 containing a lexical data base, and a screen 54. The main unit 51 comprises a keyboard controller 55 connected to the keyboard 52, a disc controller 56 connected to the mass memory 53, a screen controller 57 connected to the screen 54, a first random access memory module 58 containing a classification scheme constructed in accordance with the invention, an inflection module 59 constructed in accordance with the invention, a main program module 60, a second random access memory module 61 into which text files originating from the mass memory can be loaded, and a processor unit 62 which controls all the referenced modules and controllers. The main program module 60 processes text files stored in the second memory module 61. When the main program module is to decide the inflection of a given word, the inflection module 59 is actuated. This reads in the input data prepared by the main program module 60. In co-operation with the classification scheme stored in the memory module 58 the input word is then inflected. The results are then passed to the main program module, which then performs other specified program steps.

The application of the invention in a data processing unit of this kind is advantageous in that the lexical data base does not have to contain all the inflected forms of a word, thus giving a considerable saving in memory, and also in that there is no need for the lexical data base itself to be consulted in the inflection of words, and this is an advantage in respect of the program processing speed. In addition, it is a simple matter to replace a modular classification scheme stored in the memory module 58 by another so that inflected word forms of a different language can be obtained.

The invention is not limited to the method or embodiments described herein, but can be performed by the skilled artisan in various other ways, all of which are intended to come within the scope of the claims.

What is claimed is:
1. A computer-implemented method for inflecting words, in which an input word is inflected by reference to linguistic data stored in a memory and on the basis of input data containing said input word to be inflected, a grammatical category associated with said input word, grammatical features associated with said input word, and a required inflection category, which comprises reading in from an input device input data containing said input word to be inflected, a grammatical category associated with said input word, grammatical features associated with said input word, and a required inflection category, storing said linguistic data in the form of a classification scheme in a random access portion of said memory, said classification scheme comprising a number of nested lists each comprising elements relating to grammatical properties, selecting inter-nested lists from said classification scheme stored in said random access portion on the basis of said input data by repeatedly selecting an element occurring from a list which corresponds to appropriate input data, and performance of a following selection on said list associated with the selected element, followed by selection of an element from a last selected list on the basis of said input data, which element comprises string operations, and performing said string operations for inflecting said input word.

2. A computer-implemented method for inflecting words according to claim 1, wherein said nested lists comprise lists of a first type with elements comprising a grammatical category, lists of a second type with elements comprising a required inflection category, lists of a third type with elements comprising a first group of current grammatical features and a second group of required grammatical features, and lists of a fourth type with elements comprising an inflection code.

3. A computer-implemented method for inflecting words according to claim 2, wherein each element of a list of said first type also comprises a list of said second type, each element of a list of said second type also comprises a list of said third type and each element of a list of said third type also comprises a list of said fourth type.

4. A computer-implemented method for inflecting words according to any one of claims 1 to 3, wherein said element which is repeatedly selected from said list is the first element of the list which corresponds to appropriate input data.

5. A computer-implemented method for inflecting words according to claim 4, which comprises selecting, in the list of the first type, the first element occurring which has a grammatical category which corresponds to the grammatical category contained by said input data, selecting, in the list of the second type associated with the selected element from the list of the first type, the first element occurring which has a required inflection category which corresponds to the required inflection category from the input data, selecting, in the list of the third type associated with the selected element from the list of the second type, the first element occurring in which all the grammatical features from the first group are contained by the grammatical features from the input data, selecting, in the list of the fourth type associated with the selected element from the list of the third type, the first element occurring which corresponds, as regards the inflection code, to an inflection code of said input data, performing on said input word the string operations contained by the element selected from the list of the fourth type, and adapting features by replacing features from the first group by features from the second group if the string operations mentioned in the previous step are successful.

6. A computer-implemented method for inflecting words according to any one of claims 1 to 3 or 5, which comprises changing said required inflection category to a predetermined inflection category if, on the basis of said input data, it is not possible to select an element in one of the lists because there is no agreement between said input data and said elements, followed by performance of the inflection step on the changed input data and on the basis of the originally required inflection category, re-performing the inflection step on the result thus obtained.

7. A computer-implemented method for inflecting words according to any one of claims 1 to 3 or 5, wherein said input data contains irregular inflections of said input word from which an inflection is selected on the basis of the required inflection category.

8. A data processing unit adapted to the inflection of words in which an input word is inflected by reference to linguistic data stored in a memory and on the basis of input data containing said input word to be inflected a, grammatical category associated with said input word, grammatical features associated with said input word, and a required inflection category, said unit comprising means for reading in input data comprising an input word to be inflected, a grammatical category associated with said input word, grammatical features associated with said input word and a required inflection category, memory means for storing said linguistic data, said linguistic data being stored in the form of a classification scheme in a memory segment of said memory means, said classification scheme comprising a number of nested lists each comprising elements relating to grammatical properties, and means for inflecting said input word by reference to said linguistic data and on the basis of said input data, wherein said inflecting means is adapted to cooperate with said memory segment in which said classification scheme is stored.

* * * * *